July 30, 1968 F. LAA 3,394,898

MAGAZINE LOADING MECHANISM FOR A TAPE RECORDER

Filed July 20, 1966

INVENTOR.
FRIEDRICH LAA
BY
Frank R. Trifari
AGENT 3,394,898

MAGAZINE LOADING MECHANISM FOR A TAPE RECORDER

Friedrich Laa, Vienna, Austria, assignor to North American Philips Company, Inc., New York, N.Y., a corporation of Delaware Filed July 20, 1966, Ser. No. 566,575
Claims priority, application Austria, Aug. 25, 1965, A 7,813/65
5 Claims. (Cl. 242—55.13)

ABSTRACT OF THE DISCLOSURE

A loading mechanism for the insertion of a cartridge tape magazine into a recorder/reproducer, including a pivotal lid having a magazine guide member and a spring-biased slide member thereon, the slide member receiving the magazine as it is inserted against the spring-bias through the guide member. Locking means lock the slide member and magazine in a first position whereby the lid is then pivoted to a closed position wherein the locking means is released and the magazine is positionally aligned for engagement with the drive mechanism of the recorder/reproducer.

This invention relates to a magnetic tape recorder/reproducer and more particularly to a loading mechanism for placing a magnetic tape cartridge in operative position on the recorder/reproducer. Mechanisms of this general type are known from U.S. Patents 2,424,697, 2,969,-929, 3,146,316 and 3,167,267, for example.

It is an object of this invention to provide a loading mechanism for a recorder/reproducer which is simple to load, unload and operate, inexpensive to manufacture and reliable in operation for placing the magazine accurately and safely in its operative position.

The above and other features, objects and advantages of the present invention will be fully understood from the following description considered in connection with the accompanying illustrative drawings.

Figure 1:
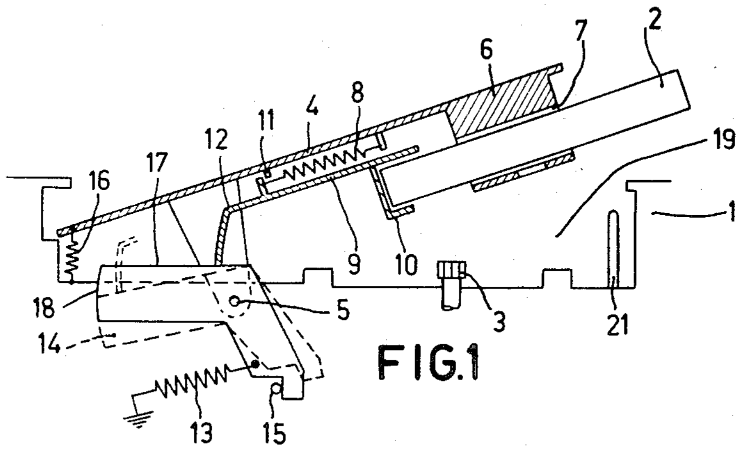
FIG. 1 is a partly cross-sectional schematic view of a guide with a magazine initially placed therein.

In FIG. 1, reference numeral 1 denotes a magnetic recording/reproducing apparatus for a tape-shaped record carrier which is accommodated in a magazine 2. A pivotal magazine support member generally designated 4 is provided for placing the magazine 2 in operative position on the apparatus 1. The support member 4 is adapted to pivot about the shaft 5 and includes a slotted guide 6. The support 4 forms a lid for the apparatus 1. The aperture 7 of the guide 6 receives the magazine 2 with a certain amount of clearance. The support 4 further accommodates a slide 9 which is displaceable against the action of a spring 8. A wall 10 of the slide 9 is engaged by magazine 2 when the latter is pushed into the slot 7 of guide 6. A stop 11 defines the position occupied by the slide 9 under the influence of the spring 8. Furthermore, the slide 9 is provided with a hook-shaped projection 12 which coacts with a locking device 14 which is likewise adapted to pivot about the shaft 5 and which is subjected to the action of a spring 13. The rest position of the locking device 14 is defined by a stop 15 in cooperation with the spring 13. Spring 16 normally positions the support 4 at an acute angle as illustrated.

In this position, the projection 12 slidably engages the upper surface 17 of the locking device 14 and the slot 7 is freely accessible. This position of the support 4 is shown in FIG. 1.

If the magazine 2 disposed in the guide 6 is pushed further into the guide 6 against the action of the spring 8, the projection 12 slides along surface 17 which in turn causes the locking device 14 to pivot, as shown in dotted lines in FIG. 1. When the projection 12 has passed the end 18 of the locking device 14, the locking device 14 tilts or snaps back into its initial position in response to the action of the spring 13 and the projection 12 is thus held behind the end of the locking device. If the magazine is no longer pushed or released, the slide 9 is held by the locking device 14 against the tensile forces imposed thereon by the spring 8. Thus, the magazine 2 engaging the slide 9 is positioned in the support 4 as shown in FIG. 2.

Figure 2:
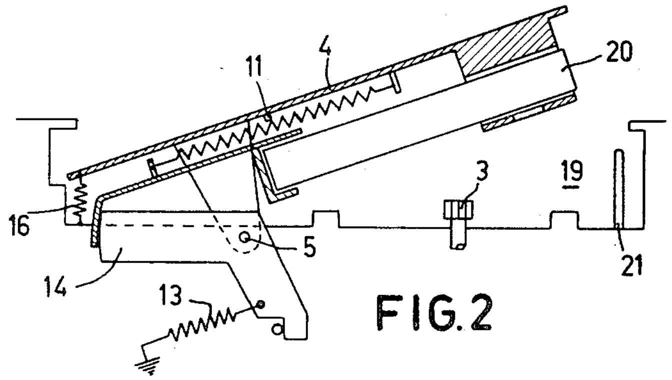
FIG. 2 is a partly cross-sectional schematic view similar to FIG. 1 in which the magazine has been fully inserted into the guide.
Figure 3:
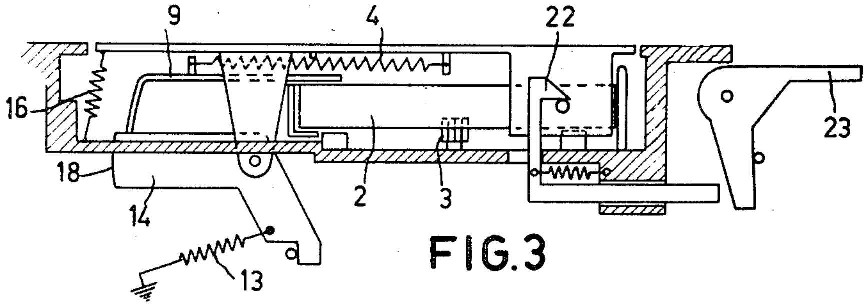
FIG. 3 is a side elevation of the guide shown in FIGS. 1 and 2 in which the magazine is operatively positioned or connected with a recording and/or reproducing apparatus.

In this position of the magazine shown in FIG. 2, the magazine 2 is in the correct position to be connected with the driving members 3 which are disposed in a recess 19 of the apparatus 1. To bring about this connection, the support 4 is moved towards the driving members 3. During this movement, support 4 turns about shaft 5 and projection 12 slides along the end 18 of the locking device 14 until it is free from the locking device. As soon as the projection 12 is free, the slide 9 and the magazine 2 are moved slightly to the right under the influence of the spring 8 so that the magazine moves outwardly of the guide 6 and engages a stop 21 fixedly arranged in the apparatus 1. The stop 21 positions the magazine for proper alignment for engagement with the driving members 3. In the operative position shown in FIG. 3, the support 4 is retained by means of a separate locking member 22. The projection 12 now engages the surface 17 of the locking device 14 (FIG. 1) in the proximity of the end 18 of the locking device 14. In this position, the slide 9 is detached from the locking device 14.

A release operating member 23, by means of which the locking member 22 can be disengaged (moved to the left in FIG. 3) serves to release the support 4 to return it to the position shown in FIG. 1 in which the magazine can be readily grasped and removed. As soon as the locking member 22 is detached from the support 4, the latter is tilted upwardly about shaft 5 by the spring 16 so that it emerges from the recess 19. When the end of the magazine 2 is disengaged from the stop 21, the slide 9 shifts the magazine 2 out of the guide 6 under the action of the spring 8, the guide 6 at the same time moving gradually upwards until it again occupies the position shown in FIG. 1.

Thus, a magazine can be placed in operative position and removed therefrom in a safe and simple manner.

While I have shown and described the preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What is claimed to be new and useful and secured by Letters Patent of the United States is:

1. A magazine loading mechanism for a magnetic tape recorder/reproducer comprising magazine support means, means pivotally connecting said support means and said recorder/reproducer for movement of said support means between a first opened position and a second closed position, said support means including a slotted guide member remote from said pivot means, said guide member receiving a magazine in said first position, a slide member adjacent said guide member for receiving a magazine, introduced through said slot of said guide member, means attached to said slide member for opposing the introduction of said magazine into said slide member, means for retaining said slide member in a locked position upon substantially complete insertion of said magazine into said guide member, and means for retaining said support means and said slide member in an operative position with respect to said recorder/reproducer in response to pivotally moving said support means to said second closed position.

2. A magazine loading mechanism according to claim 1 wherein said support means includes a lid member of said recorder/reproducer; and said recorder/reproducer is provided with a magazine well which said lid member overlies.

3. A magazine loading mechanism according to claim 1 wherein said support means includes a lid member having said slotted guide member positioned adjacent one end thereof and a first biasing means for normally positioning said support means in said first opened position, said slide member is slidably disposed and interiorly located with respect to said lid member and is adjacent said slotted guide member, said means for retaining said slide member in a locked position comprises a locking device pivotally attached to said recorder/reproducer apparatus, and a hook projection on said slide member for engaging said locking device in response to substantially complete insertion of said magazine thereby retaining said slide member in a locked position.

4. A magazine loading mechanism according to claim 3 further comprising a stop means attached to said recorder/reproducer apparatus for aligning said magazine for insuring proper engagement with a drive apparatus on said recorder/reproducer, and wherein said hook projection is disengaged from said locking device in response to pivotal movement of said lid member to said second closed position and said slide member with said magazine therein after said disengagement is moved into abutting contact with said stop means under the influence of said means attached to said slide member for opposing the introduction of said magazine into said slide member.

5. A magazine loading mechanism according to claim 1 wherein said means attached to said slide member for opposing the introduction of said magazine into said slide member comprises a spring interconnecting said support means and said slide member, said spring being biased by insertion of said magazine into said slide.

References Cited

UNITED STATES PATENTS

| | | | |
|---|---|---|---|
| 2,969,929 | 1/1961 | Rudzitis | 242—55.13 |
| 3,146,316 | 8/1964 | Knoth | 242—55.13 X |
| 3,167,267 | 1/1965 | Crane | 242—55.13 |
| 3,273,815 | 9/1966 | Schuller | 242—55.12 |

GEORGE F. MAUTZ, *Primary Examiner.*